(12) United States Patent
Zhang et al.

(10) Patent No.: US 7,197,070 B1
(45) Date of Patent: Mar. 27, 2007

(54) EFFICIENT SYSTEMS AND METHODS FOR TRANSMITTING COMPRESSED VIDEO DATA HAVING DIFFERENT RESOLUTIONS

(75) Inventors: Ji Zhang, San Jose, CA (US); Humphrey Liu, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1026 days.

(21) Appl. No.: 09/874,467

(22) Filed: Jun. 4, 2001

(51) Int. Cl.
*H04N 7/12* (2006.01)
*H04B 1/66* (2006.01)

(52) U.S. Cl. .............................................. 375/240.01
(58) Field of Classification Search .................. None
See application file for complete search history.

(56) References Cited

U.S. PATENT DOCUMENTS

| | | | |
|---|---|---|---|
| 5,508,746 A * | 4/1996 | Lim ................... 375/240.25 |
| 5,589,993 A * | 12/1996 | Naimpally ................. 386/81 |
| 5,907,374 A | 5/1999 | Liu |
| 5,912,709 A * | 6/1999 | Takahashi ............ 375/240.15 |
| 5,982,436 A | 11/1999 | Balakrishnan et al. |
| 6,038,000 A | 3/2000 | Hurst, Jr. |
| 6,101,195 A | 8/2000 | Lyons et al. |
| 6,259,732 B1 * | 7/2001 | Lee ............................. 375/240 |
| 6,275,531 B1 * | 8/2001 | Li ......................... 375/240.12 |
| 6,611,624 B1 | 8/2003 | Zhang et al. |
| 6,738,169 B1 * | 5/2004 | Nakase ....................... 358/539 |
| RE38,564 E * | 8/2004 | Eifrig et al. ................ 382/236 |
| 6,781,606 B2 * | 8/2004 | Jouppi ........................ 345/698 |
| 6,996,172 B2 * | 2/2006 | Ishtiaq et al. ............ 375/240.1 |
| 7,020,195 B1 * | 3/2006 | McMahon ............. 375/240.11 |
| 2002/0097322 A1* | 7/2002 | Monroe et al. ............. 348/159 |

OTHER PUBLICATIONS

Ji Zhang and Yi Tong Tse, A System and Method for Frame Accurate Splicing of Compressed Bitstreams, U.S. Appl. No. 09/173,708 filed Oct. 15, 1998, 69 pages.

ISO/IEP "*Information Technology-Generic Coding Of Moving Pictures And Associated Audio: Systems*", ISO/IEC 13818-1, Nov. 13, 1994, 135 pages.

ISO/IEP "*Information Technology-Generic Coding Of Moving Pictures And Associated Audio Information: Video*", ISO/IEC 13818-2, 1995 209 pages.

ISO/IEP "*Information Technology-Generic Coding Of Moving Pictures And Associated Audio: Audio*", ISO/IEP 13808-3, Nov. 11, 1994, 104 pages.

(Continued)

*Primary Examiner*—Nhon Diep
(74) *Attorney, Agent, or Firm*—Beyer Weaver LLP

(57) ABSTRACT

The present invention relates to systems and methods for combining compressed video data encoded or received with different resolutions. The present invention combines the compressed video data from the two separate bitstreams without decoding and re-encoding each bitstream. To do so, the present invention determines which compressed video bitstream has video data with a lower resolution, and applies a tiling process that alters the low resolution compressed video data such that it may be displayed at a high resolution.

22 Claims, 10 Drawing Sheets

OTHER PUBLICATIONS

Society of CableTelecommunications Engineers, Inc., Engineering Committee Digital Video Subcommittee, "*Digital Program Insertion Splicing API*", Document DVS, Nov. 15, 2000, 28 pages.

Carlos V. Girod, Jr., "*Standards and Recommended Practices*", SMPTE Journal, Oct. 1998, pp. 915-925.

Motion Picture and Television Engineers, "*SMPTE Standard for Television—Splice Points for MPEG-2, Transport Streams*", SMPTE 312M-1999, 20 pages.

Le Gall, Didier J., "*MPEG: A Video Compression Standard for Multimedia Applications*", Communications of the ACM, Apr. 1991, vol. 34, No. 4, pp. 47-57.

Le Gall, Didier J., "*The MPEG Video Compression Algorithm. A Review*". Proc. SPIE vol. 1452, Image Processing Algorithms and Techniques II (1991), pp. 444-457.

M. Knee and N. Wells, "*Seamless Concatenation—A $21^{st}$ Century Dream*", Paper Presented at the International Television Symposium (ITVS) Montreux, Jun. 16, 1997, 11 pages.

* cited by examiner

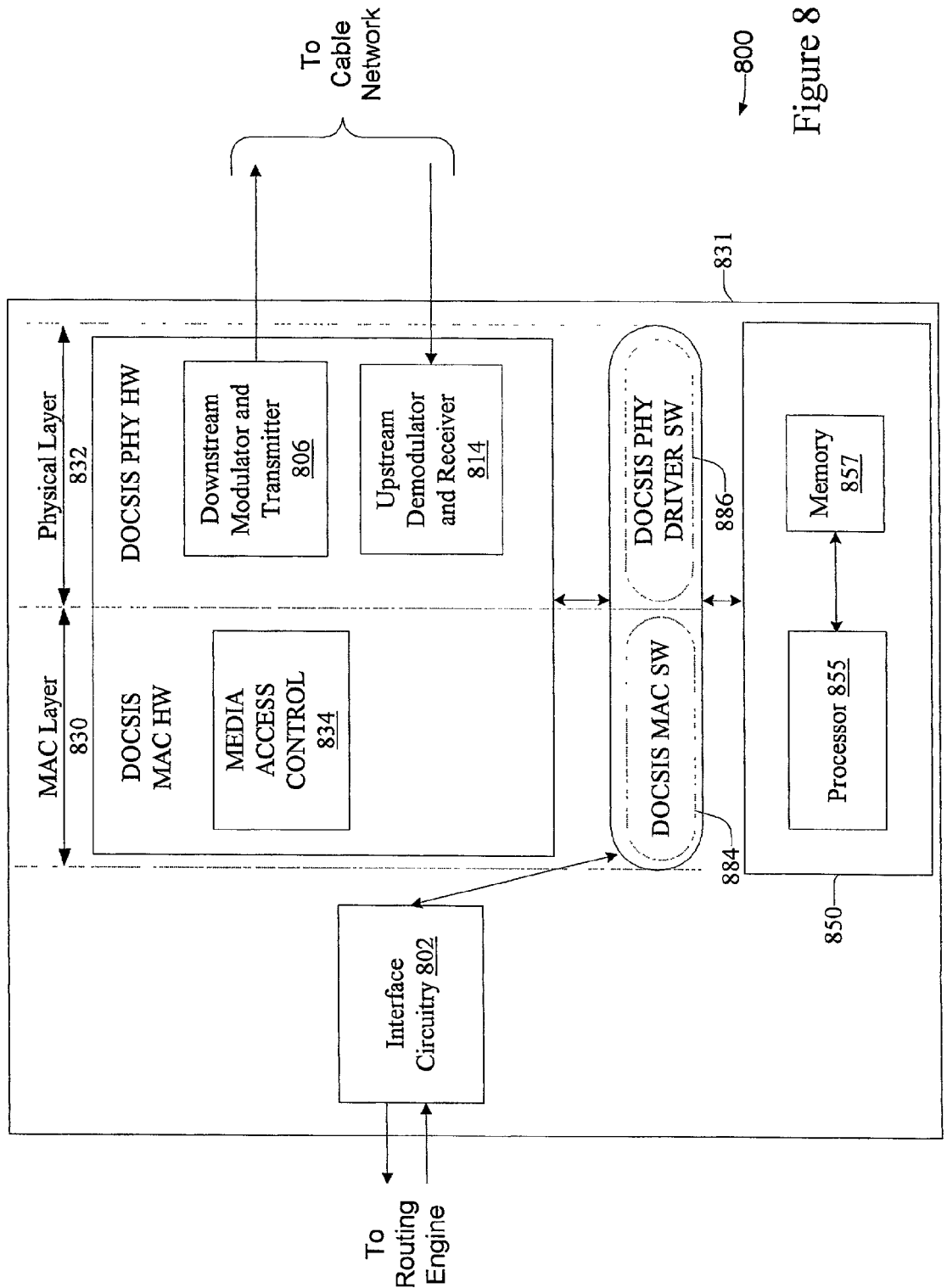

EFFICIENT SYSTEMS AND METHODS FOR TRANSMITTING COMPRESSED VIDEO DATA HAVING DIFFERENT RESOLUTIONS

BACKGROUND OF THE INVENTION

The present invention relates generally to systems and methods for transmitting data. More specifically, the present invention relates to systems and methods for combining and transmitting compressed digital video data having different resolutions over communication channels.

Video services are provided by a spectrum of different video content suppliers. For example, residential digital video services may include digital television, Video On Demand (VOD), Internet video streaming, etc.—each service typically providing video data displayable at a single resolution. Common standardized resolutions for residential home video services include D1 video resolution of 720×486, HDTV with up to 1920×1080 resolution interlaced or progressive horizontal lines.

Video data is transmitted in a bitstream, or a continuous sequence of binary bits used to digitally represent compressed video, audio or data. The bitstream is transmitted over a transmission channel. One problem with existing transmission channels is their ability to transport video data for multimedia streaming applications. In these applications, the video data requires significant bandwidth from a communication channel. Since transmission of video data with existing communication channels is often excessive, compression is an approach that has been used to make digital video images more transportable. Digital video compression schemes allow digitized video frames to be represented digitally in much more efficient manner. Compression of digital video makes it practical to transmit the compressed signal using digital channels at a fraction of the bandwidth required to transmit the original signal without compression.

The video service providers typically rely on real-time encoders and pre-compressed video server storage systems to compress, and transmit the video data. These encoders and video server storage systems typically transmit data at a single resolution. In addition, both are likely to be in a remote site, away from the video service recipient.

During transmission of the compressed video data from provider to the recipient, it is common for video data to be added to the transmission by an auxiliary video content supplier. For example, local advertisers may insert local advertising video into a real time live broadcast, such as one or more local commercials in a nationally broadcast sporting event. Preferably, all digital video data provided by an auxiliary video content supplier may be combined with the compressed video data from service provider.

Auxiliary video content suppliers also use encoders that typically provide compressed video having a single resolution. When the resolution of video content provided by the auxiliary video content supplier does not match the resolution of video content provided by the initial video service provider, the resolution of one or both bitstreams may need to be changed for most digital video receivers (for example, digital cable set-top boxes, DTV and DBS receivers) to seamlessly display the transition from one content to another. Unfortunately, resolution conversion typically requires complete decoding and re-encoding. This decoding and re-encoding is computationally complex for each bitstream being decoded, and the complexity scales dramatically for a real time live broadcast, such as a nationally broadcast sporting event. In addition to being computationally demanding, decoding and re-encoding also requires specialized hardware, such as specialized ASIC encoding and decoding hardware and frame buffer memory chips.

Further, a compressed video bitstream is generally intended for real-time decoded playback. The decoded real-time playback must be done at 30 frames per second for NTSC standard video and 25 frames per second for PAL standard video. This implies that all of the information required to represent a digital picture must be delivered to the destination in time for decoding and display in a timely manner. The computational time required for complete decoding and re-encoding processes may compromise timely delivery and real-time decoded playback.

Thus, there is a need for combining compressed video data having different resolutions without introducing excessive transmission complexity.

SUMMARY OF THE INVENTION

The present invention provides systems and methods for combining compressed video data encoded or received with different resolutions. The present invention combines the compressed video data from the two separate bitstreams without decoding and re-encoding each bitstream. To do so, the present invention determines which compressed video bitstream has video data with a lower resolution, and applies a tiling process that alters the low resolution compressed video data such that it may be displayed at a high resolution.

In one aspect, the present invention relates to a system for providing an output bitstream including compressed video data. The system comprises a tiling apparatus that receives first compressed video data that may be displayed at a low resolution, and outputs the first compressed video data such that it may be displayed using a high resolution. The system comprises a combiner that receives the first compressed video data that may be displayed using the high resolution and receives second compressed video data that may be displayed at the high resolution. The combiner combines the first compressed video data and the second compressed video data together to provide an output bitstream.

In another aspect, the present invention relates to a method for transmitting a bitstream comprising compressed video data. The method comprises receiving first compressed video data that may be displayed at a low resolution. The method also comprises receiving second compressed video data that may be displayed at a high resolution. The method further comprises converting the first compressed video data such that it may be displayed using the high resolution. The method additionally comprises combining the first compressed video data and the second compressed video data into an output compressed bitstream including compressed video data that may be displayed at the high resolution.

In yet another aspect, the present invention relates to a method for transmitting a bitstream comprising MPEG compressed video data. The method comprises receiving first compressed video data that may be displayed at a low resolution. The method also comprises receiving second compressed video data that may be displayed at a high resolution. The method further comprises determining the size of image borders around a set of macroblocks which define the image frame of the first compressed video data. The method additionally comprises generating additional compressed video data that may be displayed using the high resolution. The method also comprises tiling macroblocks from the first compressed video data and macroblocks from the additional compressed video data. The method further comprises combining the first compressed video data and the second compressed video data into an output compressed bitstream including compressed video data that may be displayed at the high resolution.

In still another aspect, the present invention relates to a method for transmitting a bitstream comprising MPEG compressed video data. The method comprises receiving first MPEG compressed video data that may be displayed at a low resolution. The method also comprises receiving second MPEG compressed video data that may be displayed at a high resolution. The method further comprises converting the first MPEG compressed video data such that it may be displayed using the high resolution without decoding the first MPEG compressed video data. The method additionally comprises combining the first MPEG compressed video data and the second MPEG compressed video data into an output compressed bitstream including MPEG compressed video data that may be displayed at the high resolution.

In another aspect, the present invention relates to a system for transmitting a bitstream comprising compressed video data. The system comprises means for receiving first compressed video data that may be displayed at a low resolution. The system also comprises means for receiving second compressed video data that may be displayed at a high resolution. The system further comprises means for converting the first compressed video data such that it may be displayed at the high resolution. The system additionally comprises means for combining the first compressed video data and the second compressed video data into an output compressed bitstream including compressed video data that may be displayed at the high resolution.

In yet another aspect, the present invention relates to a computer readable medium including instructions for transmitting a bitstream comprising compressed video data. The instructions comprise instructions for receiving first compressed video data that may be displayed at a low resolution. The instructions also comprise instructions for receiving second compressed video data that may be displayed at a high resolution. The instructions further comprise instructions for decoding the compressed video stream at the first resolution. instructions for converting the first compressed video data such that it may be displayed at the high resolution. The instructions additionally comprise instructions for combining the first compressed video data and the second compressed video data into an output compressed bitstream including compressed video data that may be displayed at the high resolution.

These and other features and advantages of the present invention will be described in the following description of the invention and associated Figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 8 shows a specific embodiment of a line card which may be used for implementing certain aspects of the present invention.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In some instances, well known process steps and/or structures have not been described in detail in order to not unnecessarily obscure the present invention.

In some multimedia delivery systems, compressed video data is delivered to numerous digital receiver/decoders via one or more digital transmission channels. In such multi-cast situations, the same compressed video bitstream, which has a predetermined resolution R1, must be combined with another compressed video bitstream, which has a different predetermined resolution R2. In these cases, the present invention determines which compressed video bitstream has video data with a lower resolution, and applies a tiling process that alters the low resolution compressed video data such that it may be displayed at the high resolution. In one embodiment, the tiling process occurs on a frame by frame basis and compressed static video data is used to provide additional video data needed to produce a high resolution image outside the video data provided by the low resolution video data. The product of the tiling process is a adapted high resolution compressed bitstream including the compressed low resolution video data. This adapted high resolution compressed bitstream is then combined with the second compressed video bitstream having the higher resolution such that the two bitstreams may be transmitted, decoded and displayed using the same resolution.

The invention also relates to a network device. The network device adapts an incoming bitstream, encoded or received at a first resolution, such that it may be transmitted and decoded using a higher resolution. For example, if the incoming bitstream has a resolution R1, which is less than resolution R2, the network device adds the video data encoded at the first resolution R1 with additional compressed video data to form output compressed video data that may be transmitted and decoded using the higher resolution R2. The network device does so without decoding and re-encoding the incoming video data.

Figure 1:
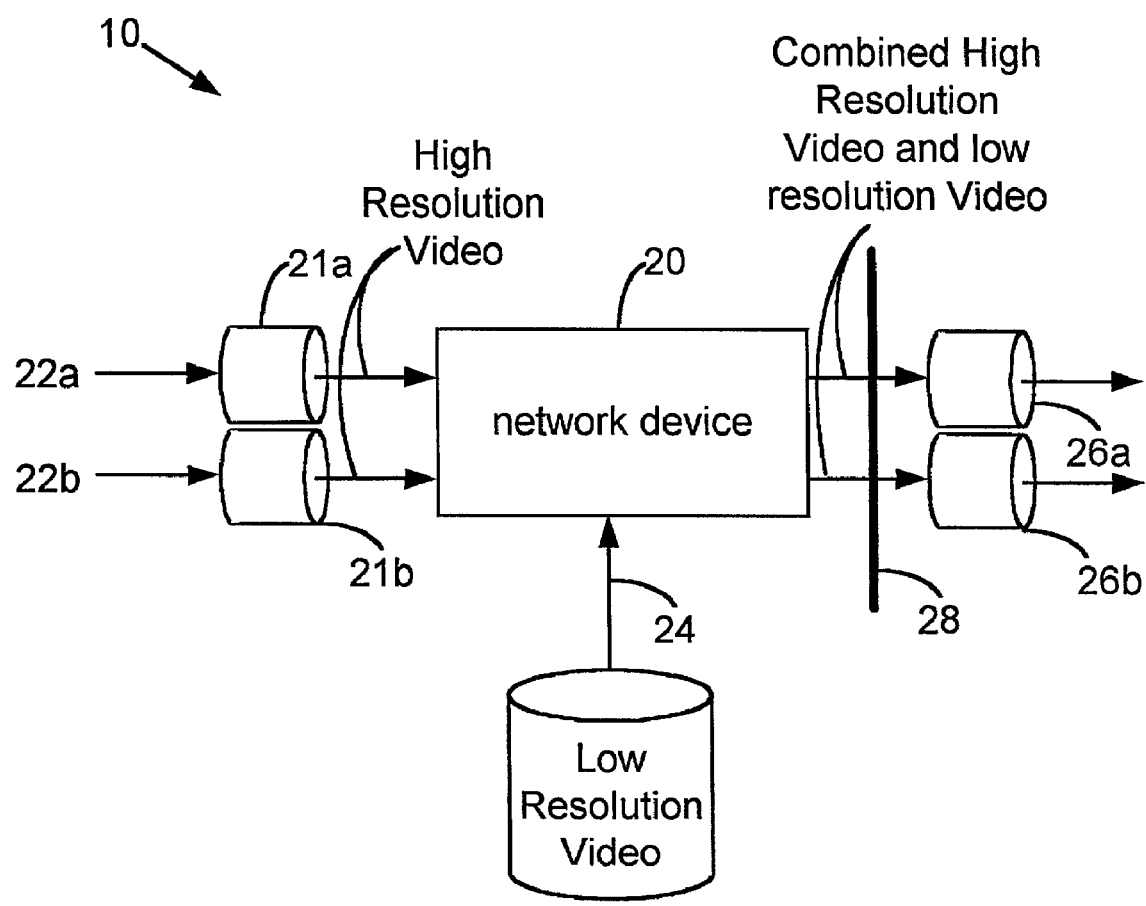
FIG. 1 illustrates a video data transmission system where one embodiment of the present invention is particularly useful in accordance with one embodiment of the present invention.

Referring now to FIG. 1, a video data transmission system 10 where one embodiment of the present invention is particularly useful will be described. System 10 includes network device 20 that adapts an incoming bitstream to provide a new compressed bitstream that may be displayed using a different resolution. Network device 20 receives one or more transmission bitstreams 22a and 22b. Each transmission bitstream 22 is received via channels 21a and 21b from a different video service provider that encodes each bitstream 22 at a different high resolution. Network device 20 also receives an incoming bitstream 24. Network device 20 combines incoming bitstream 24 with one or both of the transmission bitstreams 22 and transmits each combination onto network 28 via channels 26. Incoming bitstream 24 has a low resolution. As the terms are used herein, 'high' and 'low' are relative terms used to describe the resolution relationship between two or more compressed bitstreams. For example, high resolution video bitstream 22a includes compressed video data that may be displayed at 1920×1080 resolution, which is high relative to the resolution of incoming bitstream 24 which includes compressed video data that may be displayed at D1 video resolution of 720×486.

Network device 20 alters compressed video data in the incoming bitstream 24 such that it may be transmitted and displayed using the resolution of either transmission bitstream 22a and 22b. As will be described in more detail below, network device 20 does so by tiling macroblocks from compressed video data included in the incoming bitstream 24 and macroblocks generated or stored by the network device 20. The resulting product of this tiling process is an adapted compressed bitstream including the video data from the incoming bitstream 24 displayable at the resolution of a transmission bitstream 22. This adapted compressed bitstream is then combined, e.g., spliced or multiplexed, with the transmission bitstream 22 and transmitted from network device onto channels 26 included in network 28.

Although FIG. 1 illustrates the transmission bitstreams 22 having a higher resolution than the incoming bitstream 24, it is understood that, in some cases, the transmission bitstreams 22 may have a lower resolution in the incoming bitstream 24. In this case, the network device 20 alters the low resolution compressed video data of the transmission bitstream 22 to match the higher resolution of the incoming bitstream 24. In addition, although the present invention will be discussed primarily with reference to compressed bitstreams using a few specific resolutions, compressed bitstreams received by network device 20 may use any suitable resolution. Common conventional resolutions includes those defined by the ATSC specification, any of the digital TV formats, any HDTV formats such as those with 1920×1080, 1280×720, 720×480, 640×480.

Compression according to the MPEG standard will now be briefly described in order to facilitate understanding of the present invention. While the present invention will primarily be described in terms of transmission based on manipulation of compressed video data for an MPEG compressed bitstream, the present invention may use other video compression and packaging schemes. Other suitable 8×8 block DCT based compression standards may include MPEGX compression, H.26X compression for video conferencing, compression using proprietary video stream formats, and compression of non-real-time data bitstreams, or any other compression formats that use block based compression.

Figure 2:
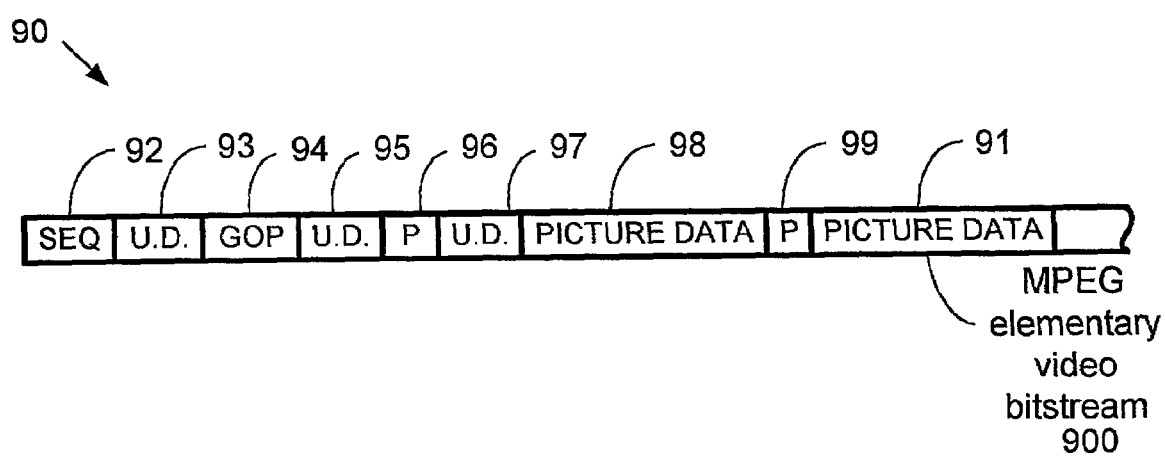
FIG. 2 illustrates an elementary video stream compressed according to MPEG standards.

The MPEG-2 compression standard consists of two layers of information: a system layer an elementary stream layer. The system layer is defined to allow a decoder to correctly decode audio and video data, and present the decoded result to the video screen in a time continuous manner. The elementary stream layer defines how compressed video (or audio) data signals are sampled, motion compensated, transform coded, quantized and represented by different variable length coding (VLC) tables. FIG. 2 illustrates an elementary video stream 90 compressed according to the MPEG standards. The elementary video stream 90 includes start code indicating processing parameters for the elementary video stream 90 such as a sequence start code 92, a sequence extension including a user data header 93, a Group of Pictures (GOP) header 94, a user data header 95, a picture header 96, and a picture coding extension that includes a user data extension 97. Picture data 98 follows the picture header 906. The elementary video stream 90 includes a second picture header 99 preceding picture data 91.

The elementary stream 90 contains the coded picture data. The basic structure for the coded picture data is a block which comprises an 8 pixel by 8 pixel array. Multiple blocks form a macroblock, which in turn forms part of a slice. A coded picture consists of multiple slices. Multiple coded pictures form a group of pictures. Such hierarchical layering of data structures allows processing according to one embodiment of the present invention to occur on a compressed layer, namely blocks and macroblocks. Typically, each macroblock is formed by 2×2 blocks, with each block formed by an 8×8 array of picture samples, or pixels, thus each macroblock represents video data for 16×16 pixels. In one embodiment, tiling of multiple compressed MPEG-2 bitstreams is a process that occurs on this macroblock layer.

The access unit level information relates to a coded picture and may specify whether the picture is an intra frame (I frame) containing full picture information, a predicted frame (P frame) which is constructed using a past I or P frame, or a bi-directional frame (B frame) which is bi-directionally constructed using past or future I, P or B frames. Splicing in accordance with one embodiment of the present invention occurs between frames of multiple compressed bitstreams.

The structure of an MPEG bitstream is well-known to one of skill in the art and is described by the MPEG standards. The present invention is suitable for use with the MPEG-1 specification, described in ISO/IEC International Standard 11172; "Coding of moving pictures and associated audio for digital storage media up to about 1.5 Mbits/s", November 1993, which is herein incorporated by reference. The present invention is also suitable for use with the MPEG-2 specification, described in ISO/IEC International Standard 13818; "Generic coding of moving pictures and associated audio information", November 1994, which is herein incorporated by reference. The present invention is also suitable for use with the MPEG-4 specification, described in ISO/IEC International Standard; "Coding of moving pictures and associated audio information", March 2000, which is herein incorporated by reference.

Figure 3A:
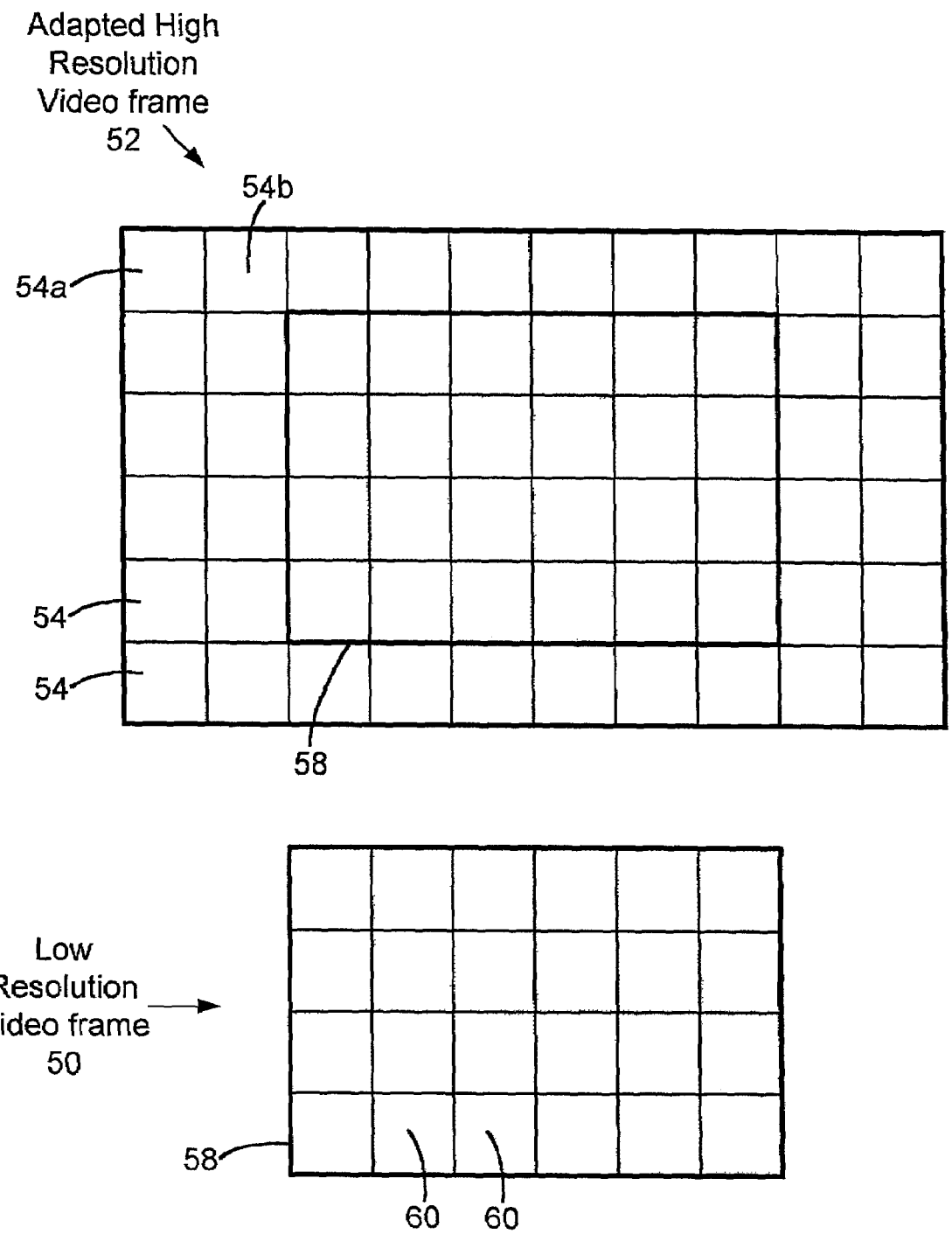
FIG. 3A illustrates the tiling of low resolution compressed video data such that it may be displayed using a high resolution in accordance with one embodiment of the present invention.

FIG. 3A illustrates the tiling of low resolution compressed video data such that it may transmitted, decoded and displayed using a high resolution in accordance with one embodiment of the present invention. A simplified low resolution frame 50 is taken from incoming compressed video bitstream 24 of FIG. 1 and has a resolution of 6×4 macroblocks. Incoming bitstream 24 is to be altered to a high resolution according to transmission bitstream 22*a*, which has a resolution of 10×6 macroblocks. Adapted frame 52 has a resolution of 10×6 macroblocks and comprises the low resolution frame 50 and additional compressed video data. The additional compressed video data comprises static macroblocks 54 added to adapted frame 52 to allow the low resolution frame 50 to be output at the high resolution.

Building the adapted high resolution frame 52 using macroblocks 60 from the low resolution video frame 50 and static macroblocks 54 is a process herein referred to as 'tiling'. Tiling is a process of combining compressed data from multiple compressed video data sources to form a single compressed video output. For FIG. 3A, tiling is process of combining macroblocks from a low resolution compressed video frame and macroblocks stored by the network device 20 to form the adapted high resolution video frame 52. The resolution of the adapted high resolution video frame 52 matches the resolution of the compressed video data that the low resolution compressed via data is being combined with.

In order to place the low resolution frame 50 within the adapted high resolution video frame 52, the difference between the low resolution dimensions and high resolution dimensions is first determined. Tiling thus begins by determining a low resolution border 58 around the perimeter of the low resolution video frame 50. The low resolution border 58 assists the placement of the low resolution video frame 50 within the high resolution converted video frame 52. More specifically, based on the difference between resolutions of the low resolution frame 50 and the high resolution frame 52, the low resolution frame 50 is positioned within the high resolution video frame 52. In a specific embodiment, the low resolution frame 50 is centered within the high resolution video frame 52.

The dimensions of the low resolution border 58 are determined by the number of pixels and corresponding number of macroblocks 60 included in the low resolution frame 50. In this case, low resolution video frame 50 has a resolution of 96×64 and a low resolution border 58 of 6×4 macroblocks. The number of macroblocks included in the high resolution frame (10×6 macroblocks in this case) is then compared to the size of the low resolution border 58. As shown in FIG. 3A, low resolution video frame 50 fits within the adapted high resolution video frame 52 with the addition of four static macroblocks in the horizontal direction and two static macroblocks in the vertical direction. For FIG. 3A, low resolution video frame 50 is centered within the high resolution video frame 52. Thus, two columns of static macroblocks 54 are tiled to the left of low resolution border 58 and two columns of static macroblocks 54 are tiled to the right of low resolution border 58. In addition, one row of static macroblocks 54 is tiled on top and below low resolution border 58.

For the tiling process used by network device 20, macroblocks 60 for the low resolution frame 50 and static macroblocks 54 are 'tiled' in raster order. More specifically, the tiling process involves starting at the upper left corner of the adapted high resolution frame 52 being built, and for each macroblock, or 'tile' in the high resolution video frame, a decision is made as to whether the macroblock is included in the low resolution video frame 50, or not. In this case, the position of the low resolution border 58 is stored in memory and used as a reference for determining whether the next tiled macroblock is included therein. In addition, the low resolution border 58 is also used as a reference for the location of individual macroblocks 60 within the low resolution video frame 50 as they are entered into the adapted high resolution video frame 52. When the next macroblock being tiled is not included within the low resolution border 58, a static macroblock 54 is used. When the macroblock is included in the low resolution video frame 50, the appropriate macroblocks 60 the selected from the low resolution video frame 50, according to the known location of the low resolution border 58 and known locations of each macroblock 60. This decision process occurs for each macroblock moving left across the first row of macroblocks for adapted high resolution video frame 52, and then the next row, etc.

Location of each macroblock 60 in the low resolution video frame 50 is embedded in the low resolution video bitstream. Once all the macroblocks are encoded in the raster order, and the tiling apparatus 150 is ready to generate a higher resolution slice. It begins by producing the slice header and replaces the macroblocks with static macroblocks until the region for the low resolution video is reached. When this happens, the tiling apparatus 150 imports the lower resolution slice into higher resolution slice. Typically, this can be done by simply copying macroblocks from the first macroblock to the last macroblock of the low resolution slice. Then, the tiling apparatus would replace the rest of macroblocks in the slice with the static macroblocks. These static macroblocks can be either simple color macroblock, macroblocks with precoded text, or macroblocks with static image, for example.

The tiling process occurs for each tiled or macroblock included in the adapted high resolution video frame 52. When finished with the current frame, the tiling process then begins with the next compressed video frame. The low resolution video data may then be transmitted, decompressed, and viewed using a high resolution video output, such as a monitor or television. In this case, the low resolution video data only covers limited portion of a high-resolution image, as shown in FIG. 3A.

The static video data macroblocks 54 added to the adapted high resolution video frame 52 outside the low resolution border 58 include uncompressed video data without motion. This may include solid black or any other color video data. Alternatively, the static video data may include static printing such as local advertising information, e.g., phone numbers and locations. When compressed, the minor amount of non-moving video data included in the static macroblocks 60 introduces minimal overhead to creating the adapted high resolution video frame 52. As result, the increased bit rate encountered by converting the low resolution video frame 50 to be output using a higher resolution as described in FIG. 3A is minimal.

Figure 3B:
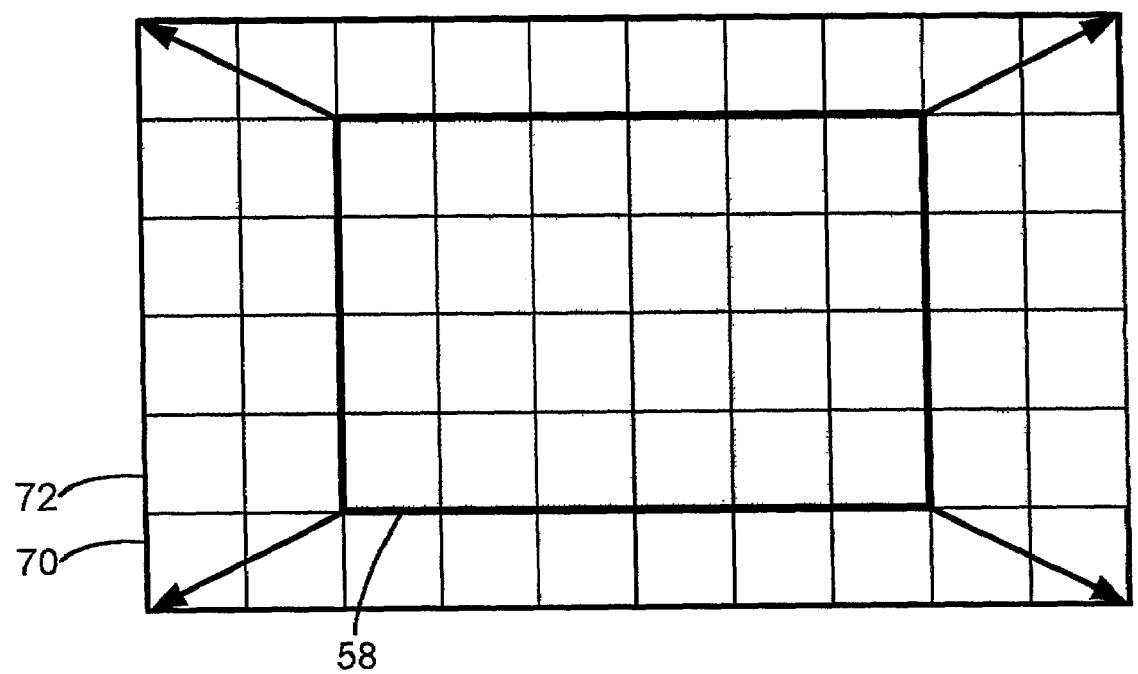
FIG. 3B illustrates pan-and-scan alteration of a low resolution video frame for full screen decoded video output in accordance with one embodiment of the present invention.

In a specific embodiment, network device 20 adds pan-and-scan information to the adapted high resolution video frame 52 bitstream. The pan-and-scan information allows decoded video output of the low resolution video frame 52 to be converted to the full-size of the video display. FIG. 3B illustrates pan-and-scan alteration of the low resolution video frame 50 for full screen decoded video output 70. In some cases, alteration of the low resolution video frame 50 in this manner may lead to softness in the output video image.

The pan-and-scan information includes the required pan-and-scan parameters to convert the low resolution video frame 50 to the full size of the output video. These required pan-and-scan parameters are described in the MPEG specifications incorporated by reference above. The network device adds the pan-and-scan information in the adapted high resolution video frame 52 bitstream. In a specific embodiment, the pan-and-scan information is inserted as a data structure within a user data header 95. The MPEG standards allow for a region in the user data header 95 to be used for user-defined information as described in the MPEG specification. In another specific embodiment, the pan-and-scan information is inserted within the elementary stream just before the picture data fields in picture header 99. The use of the pan-and-scan allows the receiver to display a smaller sub-region of a high resolution image. The information contained in the header allows the receiver to display, for example, only the low resolution region of the spliced bitstream. In this case, the low resolution bitstream is tiled into a high resolution bitstream, but to the receiver side viewers, the image is still the low resolution image with no additional borders.

In one embodiment, the decoded video output 70 has a resolution of 720×480 pixels, which equates to 45×30 macroblocks according to the above MPEG-2 compression scheme. In this embodiment, the low resolution bitstream may be a DVD title which contains a letterbox display format. Specifically, a letterbox region 72 includes, for example, an active display region of 45×22 macroblocks, which equates to a 720×352 pixel active display image region. In this case, this DVD title may be 'tiled' into a high resolution bitstream with 45×40 macroblocks, resulting in the top and bottom four rows of macroblocks being black.

For MPEG compressed video, coded images are formed by integer number of macroblocks. In other words, there must be an integer number of rows and columns of macroblocks in the x or y direction of an image. Therefore, the image region size, measured in number of pixels in the x or y direction, is a multiple of 16. As a result, there is usually an integer number of columns and rows of 'padding' macroblocks to turn a low resolution image into a high resolution one. If there is an odd number of rows of black macroblocks needed to pad a low resolution bitstream into a high resolution, macroblocks cannot be divided. For example, if there are three rows of black macroblocks needed to tile a low resolution bitstream into a high resolution, the present invention does not add 1.5 rows on the top and bottom. Instead, the present invention either adds two rows on top one row on bottom, or one row on top and two rows on bottom.

One advantage of the tiling process described above with respect to FIG. 3A is that the entire process occurs without decoding and re-encoding the compressed video data for either compressed bitstream being spliced together. For a network device such as network device 20, the reduced complexity in not having to decode the low resolution video frame is significant. As a result, the adapted high resolution video frame 52 may then be spliced with the high resolution video data transmission without introducing significant computational complexity and/or requiring additional decoding hardware. The computational savings are more pronounced when the network device is required to repeatedly process and transmit large numbers of bitstreams in a limited time.

The two high resolution bitstreams are then combined. Combining the bitstreams may be done in any manner so as to produce a single output bitstream including both the high resolution video 22*a* and the adapted high resolution video 52. The compressed video is combined such that the two sets of video data may be transmitted, decoded and displayed using the high resolution. Combining may include multiplexing, re-multiplexing, packaging in a higher layer transport stream, splicing, etc.

Figure 4:
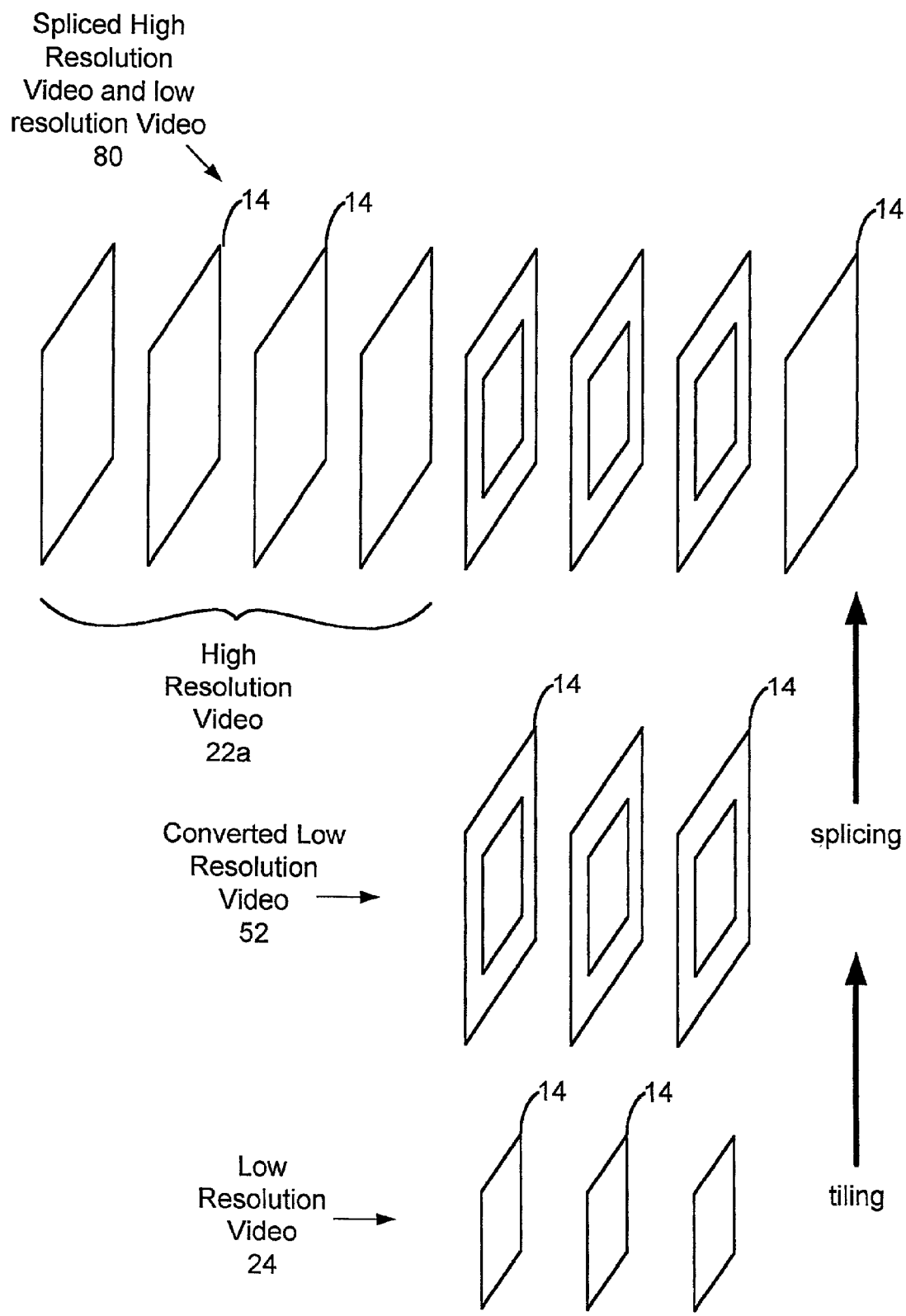
FIG. 4 illustrates the splicing of two compressed bitstreams received by network device of FIG. 1 in accordance with one embodiment of the present invention.

FIG. 4 illustrates the splicing of two compressed bitstreams received by network device 20 in accordance with one embodiment of the present invention. Splicing (also known as bitstream concatenation) is a process that replaces part of a digital compressed bitstream by another compressed bitstream, which may have been encoded off-line in a different location or at a different time. Splicing includes a series of transitions made between a first bitstream and a second bitstream. Each transition is called a splice point. Splicing is a well-known practice in the art and not described in detail for sake of brevity. Suitable splicing techniques for compressed bitstream splicing are described in commonly owned U.S. patent application Ser. No. 09/173,708 (now U.S. Pat. No. 6,611,624), which is incorporated herein for all purposes.

The first compressed bitstream corresponds to the high resolution video bitstream 22*a* and includes compressed video data using the high resolution. The second compressed bitstream corresponds to the adapted high resolution video 52 and includes the low resolution video data 24 of FIG. 1. After the low resolution video data has been tiled as described above with respect to FIG. 3A, the adapted high resolution video frame 52 its spliced together with the high resolution video bitstream 22*a*. The compressed bitstream are spliced on a frame by frame basis to produce a spliced high resolution compressed bitstream 80 including the high resolution video data and converted low resolution video data.

Although the present invention has been described with respect to splicing together compressed video data provided by local advertising with compressed video data provided by a video service during transmission, the present invention is not limited to the broadcast scenario described above and may include combining two more bitstreams from any sources at any point in video data transmission. Thus, the compressed video data spliced together may include compressed video data from any two separate compressed video data bitstreams having different resolutions and received at a network device.

Figure 5A:
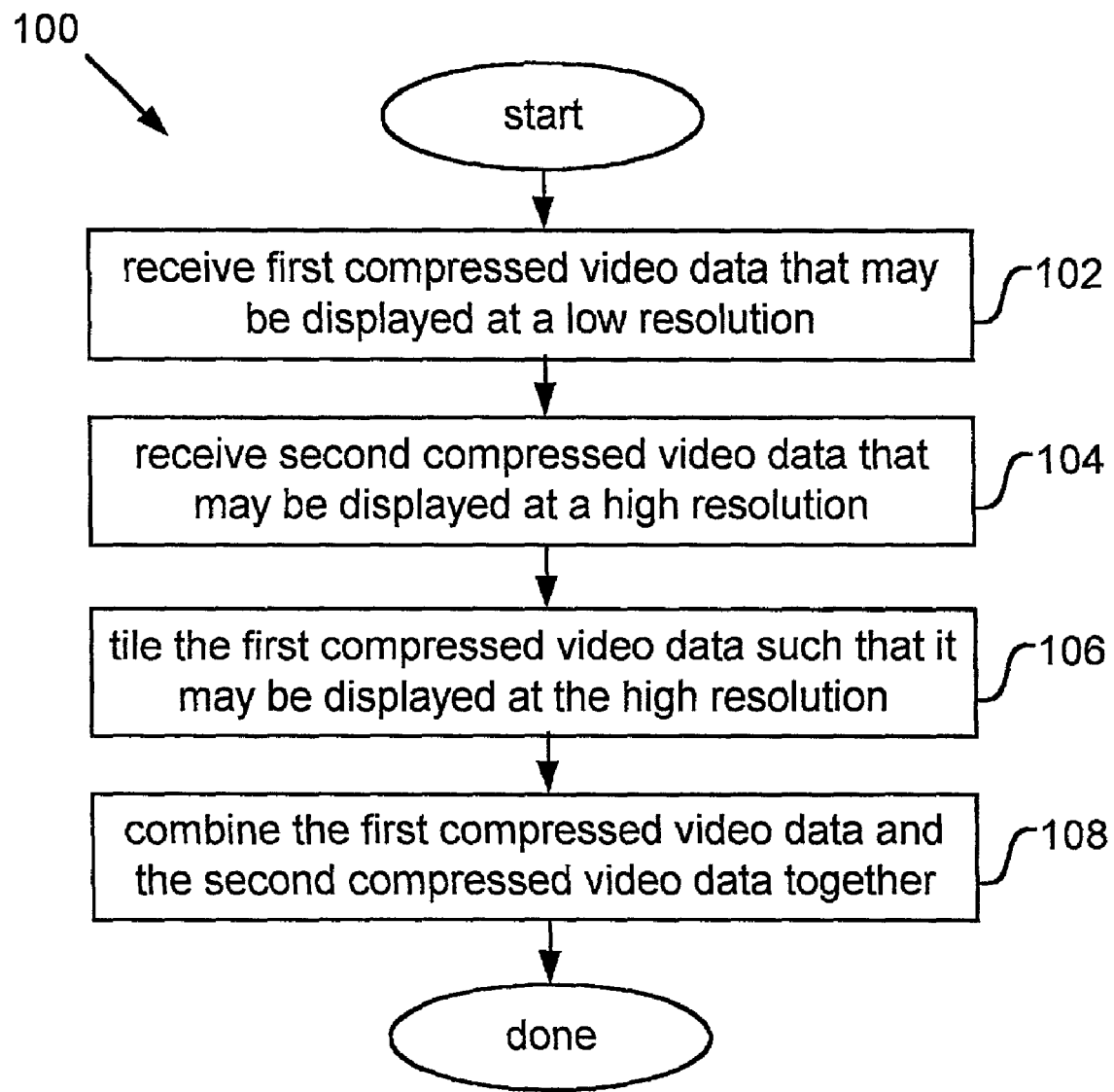
FIG. 5A is a process flow for transmitting a bitstream comprising compressed video data according to one embodiment of the present invention.

FIG. 5A is a process flow 100 for transmitting a bitstream comprising compressed video data according to one embodiment of the present invention. The process flow 100 may take place in any network device such as the network device 20 of FIG. 1. Processes in accordance with the present invention may include up to several additional steps not described or illustrated here in order not to obscure the present invention. While compressed video bitstream transmission will now be described as a method, those skilled in the area will recognize that the present invention encompasses a system or software having units capable of performing the actions as described below.

The process flow 100 begins by receiving first compressed video data that may be displayed at low resolution (102). Upon receiving the first compressed video data at a headend or any other suitable network device, network device may then store the video data on local memory. Second compressed video data that may be displayed at a high resolution is also then received (104). After determining the resolution for the second compressed video data, the tiling process than begins on the first compressed video data (106). The tiling process alters the low resolution compressed video data such that may be displayed using the high resolution corresponding to the second compressed video data. In one embodiment, the tiling process occurs on a frame by frame basis and compressed static video data is used to provide video data needed to produce a high resolution image outside that produced by the low resolution video data. The product of the tiling process is an adapted high resolution compressed bitstream including the compressed low resolution video data. This adapted high resolution compressed bitstream is then combined (108) with the second compressed video bitstream having the high resolution such that the two bitstreams may be transmitted, decoded and displayed using the high resolution.

Figure 5B:
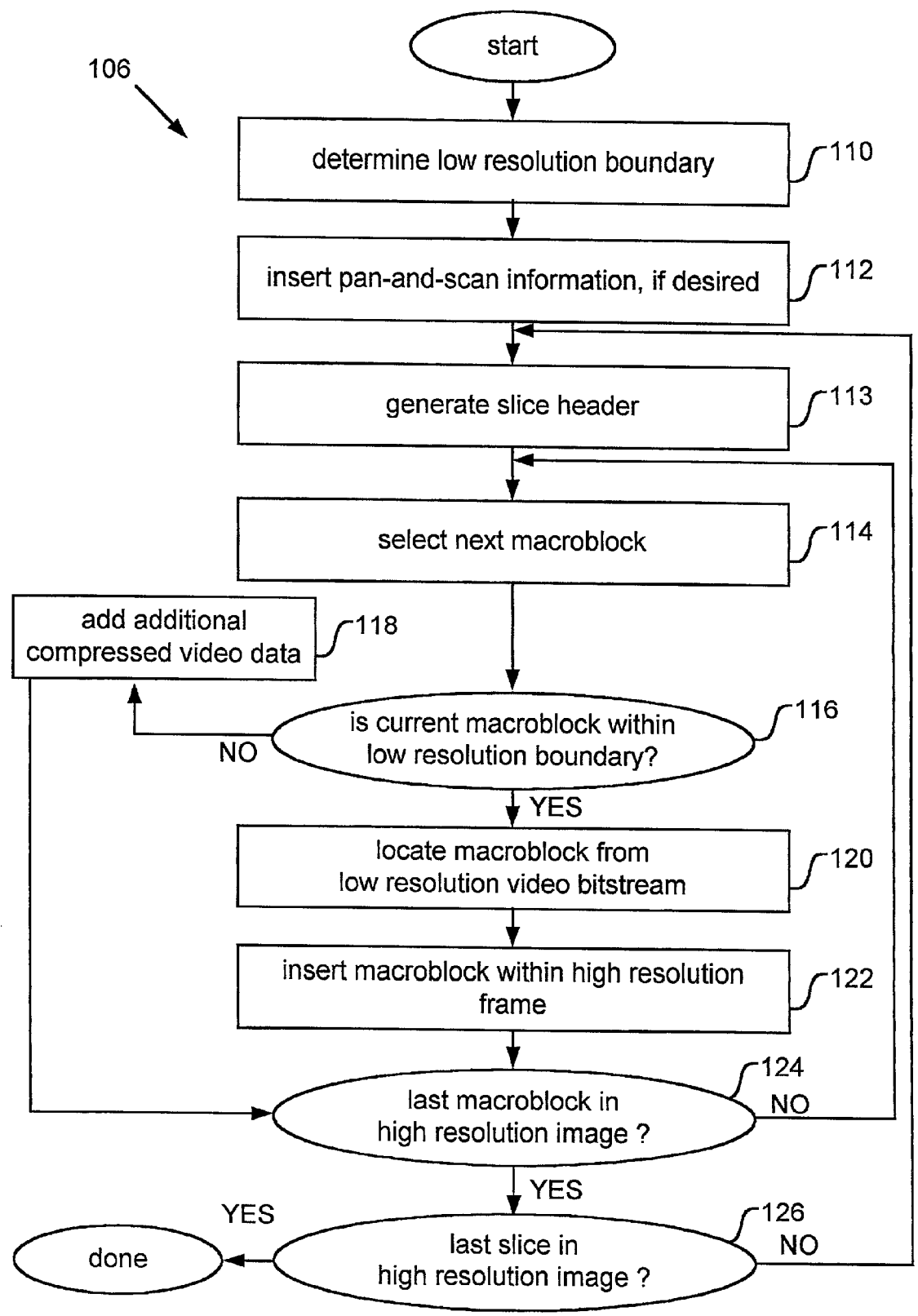
FIG. 5B is a process flow for tiling a low resolution compressed video data to produce compressed video data that may be displayed using a high resolution according to one embodiment of the present invention.

FIG. 5B is a process flow 106 for tiling a low resolution compressed video data such that the low resolution compressed video may be displayed with a high resolution according to one embodiment of the present invention. Tiling according to process flow 106 occurs on a macroblock level and a frame by frame basis.

For each frame in the low resolution compressed bitstream, process flow 106 begins by determining a low resolution boundary for the low resolution compressed video data (110). The low resolution boundary describes the dimensions for the low resolution compressed video data in terms of macroblocks. The low resolution boundary is then positioned within the macroblock dimensions of the high resolution compressed video data. If there is an integer number of macroblocks that fit around the low resolution border within the high resolution, than tiling may begin. Otherwise, tiling according to process flow 106 determines the location of any fractional macroblocks and stores the positions of the fractional macroblocks.

At this point, the low resolution compressed video data will occupy a subspace to the high resolution video image upon video output. In one embodiment, the low resolution boundary is used to produce pan-and-scan information that allows the compressed low resolution video data to be output using the entire space of the high resolution video image upon video output (112). Process flow 106 then generates a slice header for the next slice in the high resolution compressed video data (113).

Having determined the low resolution boundary for the compressed low resolution video data and positioned the compressed low resolution video data within the high resolution frame, tiling of each macroblock for the compressed high resolution bitstream then begins. The macroblocks are selected and tiled individually in raster order (114). Thus, referring to FIG. 3A, the first macroblock to be tiled is the upper left macroblock 54a. Macroblocks to the left of macroblock 54a are then tiled one by one moving left to right. Upon completion of the first row, the next row of macroblocks are then tiled.

For each macroblock been tiled, a decision is made as to whether the current macroblock being tiled is within the low resolution boundary (116). If it is, than the current macroblock is located within the current frame of the compressed low resolution video data (120) and inserted within the compressed high resolution frame. If the current macroblock being tiled is not within the low resolution boundary, than static video data is used as the current macroblock being tiled (118). After the macroblock has been tiled, the tiling process determines (124) whether this macroblock is the last macroblock in the high resolution frame (lower right for raster scan). If not, in the tiling process selects the next macroblock (114). If the current macroblock is the last macroblock in the slice, in the tiling process is finished for that slice and the tiling process determines (126) whether this slice is the last slice in the high resolution frame. If not, the tiling process selects the next slice and generates a slice header (113). If the current slice is the last slice in the high resolution frame, in the tiling process is finished for that frame.

Having discussed exemplary methods of combining compressed bitstreams comprising video data initially provided with different resolutions, the network device 20 of FIG. 1 will now be described in more detail in accordance with several embodiments of the present invention.

Figure 6A:
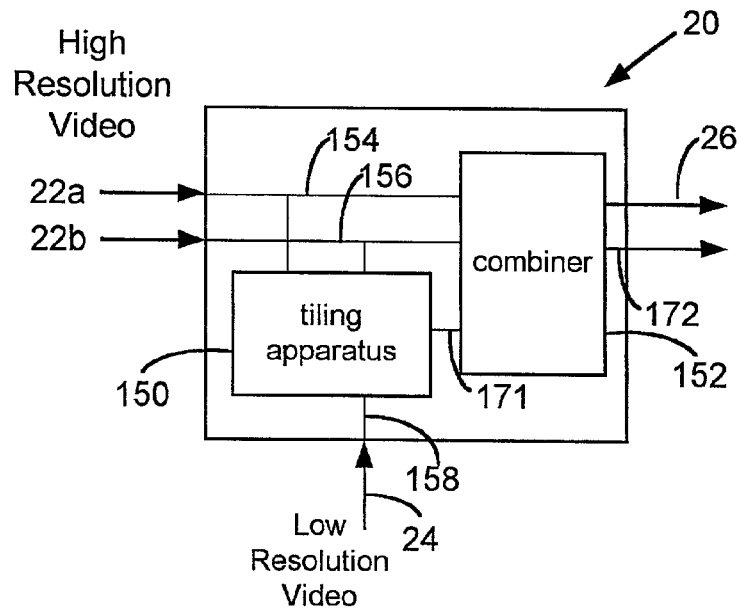
FIG. 6A illustrates the network device of FIG. 1 in more detail in accordance with one embodiment of the present invention.

As shown by FIG. 6A, one embodiment for the network device 20 comprises: a tiling apparatus 150, and a combiner 152. While the present invention will now be described as an apparatus composed of units, those skilled in the area will recognize that the present invention encompasses a method, process or software having as steps the actions performed by each unit and described below.

Figure 6B:
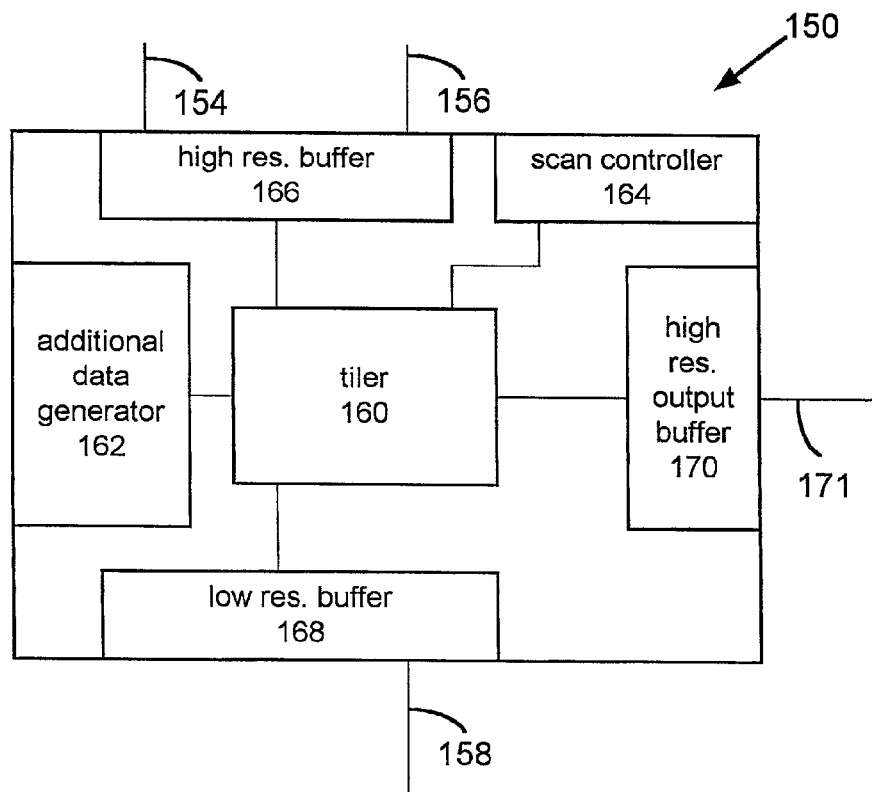
FIG. 6B illustrates the tiling apparatus of FIG. 6A in more detail in accordance with a specific embodiment of the present invention.

Network device 20 receives one or more transmission bitstreams 22a and 22b via channels 21a and 21b. The transmission bitstreams 22 are provided to tiling apparatus 150 and combiner 152 via lines 154 and 156. Network device 20 also receives an incoming bitstream 24 having a low resolution, which is provided to tiling apparatus 150 via line 158. As shown in FIG. 6B, tiling apparatus 150 comprises: tiler 160, additional data generator 162, scan controller 164, high resolution input buffer 166, low resolution input buffer 168, and high resolution output buffer 170.

Low resolution input buffer 168 stores the incoming bitstream 24 including compressed video data displayable using a low resolution. Additional data generator 162 generates and stores static compressed video data that may be displayed using the high resolution. Additional data generator 162 may include a compressed static data buffer that stores a set of commonly used static video data useful for combining with compressed low resolution video data to provide high resolution video images. When network device 20 is used to provide advertising and static data insertion for local area network, for example, the static data buffer may include compressed macroblocks for black video output and static local advertising that includes, for example, web URLs and phone numbers for local businesses.

Tiler 160 combines the compressed low resolution video data provided by incoming bitstream 24 and static compressed video data produced by additional data generator 162. To do so, tiler 160 combines macroblocks from both compressed video data sources on a macroblock by macroblock basis for each frame of the compressed low resolution video data. Frame by frame tiling first begins by determining the size of a low resolution border around the compressed low resolution video data. The low resolution border is typically consistent between frames of the compressed low resolution video data. Tiler 160 then tiles macroblocks from each compressed bitstream based on their position relative to a low resolution border as described above. Scan controller 164 is aware of the resolution of the high resolution output and selects the high resolution macroblocks that tiler 160 tiles using macroblocks from either the first compressed video data or the static compressed video data.

When tiling is finished, an adapted high resolution compressed bitstream is produced and stored in high resolution output buffer 170. The adapted compressed bitstream is sent from output buffer 170 to combiner 152 via line 171. The converted compressed bitstream is a bitstream having low resolution compressed video data that that has the data structure (syntax) of a high resolution bitstream and may be displayed at a higher resolution and is compliant to the MPEG standard. High resolution input buffer 166 stores one or more of the incoming transmission bitstreams 22. Both high resolution buffers 166 and 170 then hold compressed data while combiner 152 combines the two compressed high resolution bitstreams together. The output of combiner 152 is an output compressed bitstream 172 including the high resolution compressed video data and the low resolution compressed video data. This output compressed bitstream 172 may then be transmitted from network device 20 over a transmission medium onto a communications channel 26. In one embodiment, the output compressed bitstream 172 is transmitted in real-time.

The communications channel 26 may be included in any one of a number of conventional transmission systems, including but not limited to XDSL, ATM/ADSL, ATM, ISDN links, Ethernets, public data networks, T1, T3, DS-3, OC-3, wireless/terrestrial networks, digital satellites, and digital cable networks, and particular ones are described below. In one embodiment, the network device 20 is a central office router, or a headend and the channel 26 carries the output bitstream to a geographic service area of a cable network serviced by the network device 20. A target decoder then receives and decompresses the output bitstream into an uncompressed format for video output.

There are presently a variety of different communication channels for transmitting or transporting video data. For the purposes of the present application a channel is defined broadly as a connection facility to convey properly formatted digital information from one point to another. A channel includes some or all of the following elements: 1) physical devices that generate and receive the signals (modulator/demodulator); 2) medium that carries the actual signals; 3) mathematical schemes used to encode and decode the signals; 4) proper communication protocols used to establish, maintain and manage the connection created by the channel 5) storage systems used to store the signals such as magnetic tapes and optical disks. The concept of a channel includes but is not limited to a physical channel, but also logical connections established on top of different network protocols, such as XDSL, ATM, IP, wireless, HFC, coaxial cable, Ethernet, Token Ring, etc. Transmission channels such as coaxial cable distribution networks, digital subscriber loop (DSL) access networks, ATM networks, satellite, or wireless digital transmission facilities are all well known. Although not shown, network device 20 may also include one or more network interfaces such as receivers and transmitters that receive and transmit compressed video data from and onto these communication channels.

In one embodiment, network device 20 may also change the bit rate of the modified compressed bitstream according to the available bandwidth on the channel 26 between network device 20 and a target decoder. Bit rate conversion, or transcoding, of a compressed video bitstream refers to the process performed on a modified compressed video bitstream that results in a different bit resolution than the originally compressed bitstream. The network device 20 may change the bit rate according to one or more techniques such as re-quantization, resolution conversion, etc. For example, in an MPEG-2 video bitstream, it is possible to reduce the bit rate usage by increasing the quantization step value. This approach is called re-quantization. Depending on the type of video signal and the associated transmission bit rate, the different bit rate conversion methods may be combined or used alone flexibly.

In the above described embodiments, the network device 20 combines the compressed bitstreams having different resolutions in real-time. Combining compressed bitstreams according to present invention may also be done in non-real-time or off-line on prestored bitstreams using general-purpose computers such as PCs or general-purpose workstations. In many applications, particularly in web based IP streaming, the bitstream is created and stored on a large capacity web server. In this case, the high resolution compressed bitstream and the low resolution compressed bitstream are encoded and stored before streaming. While the low resolution bitstream is stored, a general-purpose computer may be used to generate additional compressed video data that allows the low resolution video data to be output using the high resolution, combined the additional compressed video data with the low resolution video data, and provide the adapted high resolution compressed video data including the low resolution video data. Thus, the present invention may be performed in non real-time and by general-purpose computers. Combining in this manner may be done on a general-purpose computer may be done entirely in software. In one embodiment, network device 20 implements ASIC basic hardware. In another embodiment where storage based multicasting of pre-encoded content is the application, the network device 20 is implemented in software.

Generally, the compressed digital video data transmission techniques of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention may be implemented in software such as an operating system or in an application running on an operating system.

A software or software/hardware hybrid system of this invention is preferably implemented on a general-purpose programmable machine selectively activated or reconfigured by a computer program stored in memory. Such a programmable machine may be a network device designed to handle network traffic. Such network devices typically have multiple network interfaces. One important class of device that may be used to implement the present invention is the Cable Modem Termination System. Preferably, the CMTS is a "routing" CMTS, which handles at least some routing functions. Alternatively, the CMTS may be a "bridging" CMTS, which handles only lower-level tasks.

Figure 7:
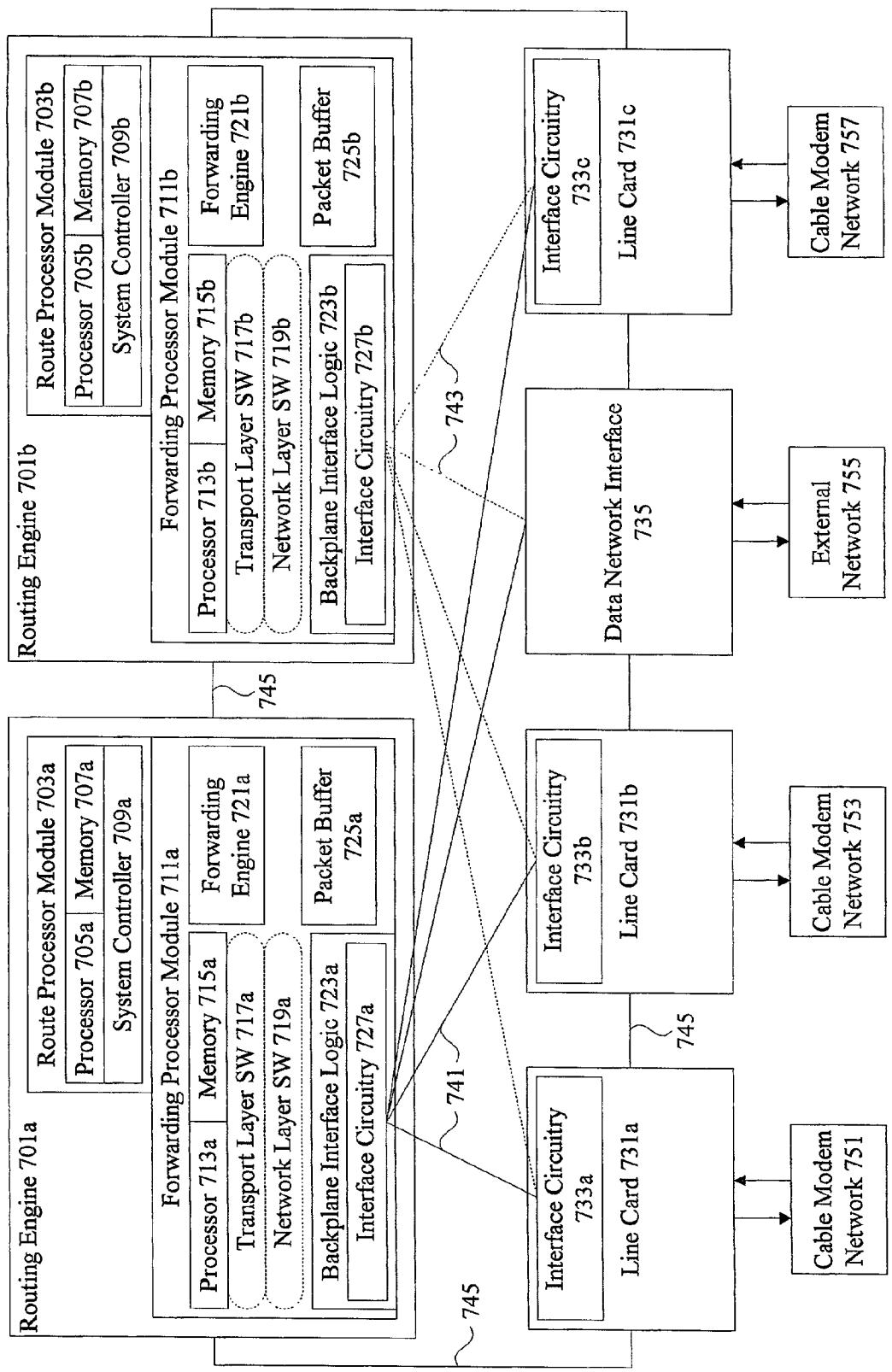
FIG. 7 shows a block diagram of a specific embodiment of a Cable Modem Termination System (CMTS) which may be used to implement certain aspects of the present invention.

FIG. 7 shows a block diagram of a specific embodiment of a Cable Modem Termination System (CMTS) 700 which may be used to implement certain aspects of the present invention. As shown in FIG. 7, the CMTS 700 may comprise a plurality of routing engines (e.g. 701a, 701b). In a specific implementation, Routing Engine A 701a may be configured as a primary or working routing engine, while Routing Engine B 701b may be configured as a backup or standby routing engine which provides redundancy functionality.

As shown in the embodiment of FIG. 7, each of the routing engines may include a variety of similar modules and/or components. In order to avoid confusion, the various components and/or modules relating to Routing Engine A 701a will now be described in greater detail with the understanding that such descriptions may also be applied to the corresponding components and modules of Routing Engine B 701b.

According to a specific embodiment, Routing Engine A may be configured or designed to include a plurality of functionally different modules or components, including, for example, a Forwarding Processor (FP) Module 711a adapted to provide packet forwarding functionality; a Route Processor (RP) Module 703a adapted to implement routing or forwarding operations; a utility component 702a adapted to provide system clock and timestamp functionality; etc. The routing engine components provide may be configured to provide layer one, layer two, layer three and layer four functionality as well as quality of service (QoS) functionality.

According to a specific implementation, the RP Module 703a may be configured as a processor-based routing system comprising functionality incorporated within a typical router, such as, for example, specially configured router models 1600, 2500, 2600, 3600, 4500, 4700, 7200, 7500, 10012, and 12000 available from Cisco Systems, Inc. of San Jose, Calif. For example, as shown in the embodiment of FIG. 7, the RP Module 703a comprises a general-purpose processor 705a (e.g., a MIPS route processor) coupled to a system controller 709a and memory 707a. It should be noted that components have been described in singular form for clarity. One skilled in the art would appreciate that multiple processors, a variety of memory formats, or multiple system controllers, for example, can be used in this context as well as in other contexts while falling within the scope of the present invention. The memory 707a may comprise synchronous dynamic random access memory (SDRAM) storage locations addressable by the processor 705a for storing software programs and data structures accessed by the components. A network routing operating system, portions of which may reside in memory and executed by the route processor, functionally organizes the router by invoking network operations in support of software processes executing on the router.

The RP processor 705a may be configured to construct and load routing tables used by the FP Module 711a. The processor 705a may also be configured or designed to perform configuration management functions of the routing engine 701a, and to communicate with neighboring peer, standby, and/or backup routers to exchange protocol data units used to construct the routing tables in accordance with conventional routing algorithms. It will be apparent to those skilled in the art that other memory types, including various computer readable media, may be used for storing and executing program instructions pertaining to the operation of the routing engine.

Interface circuitry 727a may be coupled to the respective interface circuitry 733a, 733b of line cards 731a, 731b. According to a specific implementation, interface circuitry 727a may be configured to reside on a backplane logic circuit 723a of the routing engine. In one example, the backplane logic circuit 723a is embodied as a high performance, application specific integrated circuit (ASIC). An example of a backplane logic circuit that may be advantageously used with the present invention is disclosed in co-pending and commonly owned U.S. patent application Ser. No. 09/791,063, filed on Feb. 22, 2001, the entirety of which is hereby incorporated by reference for all purposes.

According to a specific embodiment, the backplane logic circuit (which, according to a specific implementation, may be configured as an ASIC), may be configured to further interface the line cards to a packet buffer 725a and a forwarding engine 721a of the FP Module 711a. The packet buffer 725a may include memory which is configured to store packets as the forwarding engine 721a performs its packet forwarding functions. For example, the packet buffer may be used to store low priority data packets while high priority, low latency voice packets are forwarded by the forwarding engine to a data network interface 735a. According to various embodiments, the FP Module 711 may comprise a processor 713a and memory 715a for handling transport layer 717 and network layer 719 functionality. In one implementation, the processor 713a may be configured to track accounting, port, and billing information for various users on a cable modem network 751. The processor 713a may also be configured to maintain desired service flow or session state information in memory 715a such as, for example, for voice calls initiated over the cable modem network. The FP Module 711a may also be configured to provide transaction compacting functionality, data parcel tunneling functionality, etc.

According to a specific implementation, Routing Engine A 701a may be connected to Routing Engine B 701b via at least one link 746, such as, for example, a backplane line or system bus. Routing engine redundancy may be provided by designating one of the routing engines as the working or primary routing engine and designating the other routing engine(s) as the redundant or standby routing engine(s). When configured as a working routing engine, the Routing Engine A may perform all appropriate forwarding and routing functions. When a failure occurs at the working routing engine, the redundant routing engine (e.g. Routing Engine B) may then take over the operations of the working routing engine. Thereafter, when Routing Engine A recovers, it may assume the functions of the redundant routing engine, or it may take over the functions of the working routing engine.

According to different embodiments of the present invention, one or more of the routing engines may be configured to communicate with a plurality of line cards (e.g. 731, 735) via point-to-point links. For example, as shown in FIG. 7, each of the plurality of line cards 731 and 735 are connected to each of the routing engines 701a, 701b via point-to-point links 741 and 743. One advantage of the point-to-point link configuration is that it provides additional reliability in that the failure of one or more line cards will not interfere with communications between other line cards and the routing engine(s). For example, if Line Card A 731a suddenly failed, each of the routing engines would still be able to communicate with the other line cards.

According to a specific embodiment, the plurality of line cards may include different types of line cards which have been specifically configured to perform specific functions. For example, line cards 731 may correspond to radio-frequency (RF) line cards which have been configured or designed for use in a cable network. Additionally, line cards 735 may correspond to network interface cards which have been configured or designed to interface with different types of external networks (e.g. WANs, LANs,) utilizing different types of communication protocols (e.g. Ethernet, Frame Relay, ATM, TCP/IP, etc). For example the data network interface 735a functions as an interface component between external data sources and the cable system. The external data sources transmit data to the data network interface 735a via, for example, optical fiber, microwave link, satellite link, or through various media. A data network interface may include hardware and software for interfacing to various networks. According to various embodiments, a data network interface may be implemented on a line card as part of a conventional router for a packet-switched network. Using this type of configuration, the CMTS is able to send and/or receive IP packets to and from the data network interface using, for example, network layer software 719a.

According to a specific implementation, the operations associated with obtaining an IP address for cable modems may be implemented by the network layer software. This may involve the CMTS communicating with a DHCP server (not shown) via a data network interface, for example.

As shown in FIG. 7, at least a portion of the line cards includes interface circuitry for providing an appropriate interface between the host line card, other line cards, and/or the routing engine(s). For example, interface circuitry 733a may include interconnect ports coupled to one or more of the point-to-point links 741, 743. According to a specific implementation, the interface circuitry functions as a translator that converts conventional formats of data received at the line cards to a suitable protocol format for transmission from the line card to the appropriate routing engine. In one implementation, the interface circuitry 733a may also include circuitry to perform cyclic redundancy code (CRC) generation and checking on packets, along with interconnect format checking.

According to a specific embodiment, the point-to-point links 741, 743 may be configured as clock forwarded links such that each point-to-point link comprises a at least one data wire for transporting data signals and at least one clock wire for carrying clock signals. However, it will be understood to those skilled in the art that the clock forwarding technique may be scaled to accommodate other clock forwarding arrangements such as, for example, connections comprising a plurality or data signals and/or clock signals. Additionally, according to a specific embodiment, each line card may be configured to provide at least one communication interface between the routing engines (701a, 701b) and a portion of the cable network. The data network interface 735a may couple the routing engine 701a to an external data network 755 such as, for example, the Internet.

According to one embodiment, all or selected lines cards, routing engines and/or data network interfaces may be configured to use at least one common dedicated line or backplane (e.g. 745). According to other embodiments, the routing engines 701a, 701b may have an additional dedicated connection(s) for supporting redundancy. In a specific implementation, the backplane may be configured as an Ethernet medium that is shared by the CMTS. When the line cards are inserted into the backplane, they communicate with the routing engines over the lines 745 in accordance with a "capabilities" exchange that identifies the types of line cards and their various characteristics/parameters.

The compressed digital video data transmission techniques of the present invention may be implemented on various general purpose Cable Modem Termination Systems. In a specific embodiment, the systems of this invention may be specially configured CMTSs such as, for example, specially configured models in the uBR-7200 and uBR-10012 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Although the system shown in FIG. 7 represents one specific CMTS architecture of the present invention, it is by no means the only CMTS architecture on which the present invention can be implemented. For example, other types of interfaces and media could also be used with the CMTS.

Regardless of network device's configuration (for cable plants or otherwise), it may employ one or more memories or memory modules (e.g., memory 707a, 715a, etc.) configured to store program instructions for the network operations and other functions of the present invention described herein. The program instructions may specify an operating system and one or more applications, for example. Such memory or memories may also be configured to store data structures, or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

FIG. 8 shows a specific embodiment of a line card 800 which may be used for implementing certain aspects of the present invention. According to a specific embodiment, the line card 800 may be configured or designed to implement selected aspects of the DOCSIS functionality which were conventionally implemented by the CMTS, such as, for example, DOCSIS MAC functionality.

In the specific embodiment as shown in FIG. 8, line card 800 provides functions on several network layers, including a physical layer 832, and a Media Access Control (MAC) layer 830. Generally, the physical layer is responsible for receiving and transmitting RF signals on the cable plant. Hardware portions of the physical layer include at least one downstream modulator and transmitter 806 and/or at least one upstream demodulator and receiver 814. The physical layer also includes software 886 for driving the hardware components of the physical layer.

Upstream optical data signals (packets) arriving via an optical fiber node are converted to electrical signals, and then demodulated by the demodulator/receiver 814. The demodulated information is then passed to MAC layer block 830.

A primary purpose of MAC layer 830 is to encapsulate, with MAC headers, downstream packets and decapsulate, of MAC headers, upstream packets. In one embodiment, the encapsulation and decapsulation proceed as dictated by the above-mentioned DOCSIS standard for transmission of data or other information. The MAC headers include addresses to specific modems (if sent downstream), or to the CMTS (if sent upstream). Note that the cable modems also include MAC addressing components. In the cable modems, these components encapsulate upstream data with a header containing the MAC address of the CMTS.

MAC layer 830 includes a MAC hardware portion 834 and a MAC software portion 884. The MAC layer software portion may include software relating to DOCSIS MAC functionality, etc. The MAC layer hardware and software portions operate together to provide the above-described DOCSIS MAC functionality. In a preferred embodiment, MAC controller 834 is dedicated to performing some MAC layer functions, and is distinct from processor 855.

After MAC layer block 830 has processed the upstream information, it is then passed to interface circuitry 802. As described previously, interface circuitry 802 includes the appropriate hardware and/or software for converting data formats received at the line cards to a suitable protocol format for transmission from the line card to an appropriate routing engine.

When a packet is received from the routing engine at the interface circuitry 802, the packet is then passed to MAC layer 830. The MAC layer 830 transmits information via a one-way communication medium to downstream modulator and transmitter 806. Downstream modulator and transmitter 806 takes the data (or other information) in a packet structure and converts it to modulated downstream frames, such as MPEG or ATM frames, on the downstream carrier using, for example, QAM64 modulation. Other methods of modulation may also be used such as, for example, QAM256 modulation, CDMA (Code Division Multiple Access), OFDM (Orthogonal Frequency Division Multiplexing), FSK (FREQ Shift Keying), etc. The return data is likewise modulated using, for example, QAM16 or QSPK. According to a specific embodiment, the modulated data is converted from IF electrical signals to RF electrical signals (or vice-versa) using one or more electrical signal converters (not shown).

As shown in FIG. 8, line card 800 includes a central hardware block 850 including one or more processors 855 and memory 857. These hardware components interact with software and other hardware portions of the various layers within the line card. They provide general purpose computing power for much of the software. Memory 857 may include, for example, I/O memory (e.g. buffers), program memory, shared memory, etc. One or more data structures used for implementing the technique of the present invention may reside in such memory. In one embodiment, the software entities 882, 884, and 886 are implemented as part of a network operating system running on hardware 850. Preferably, at least a part of the compressed digital video data transmission functionality of this invention are implemented in software as part of the operating system. In FIG. 8, such software may be part of MAC layer software 884, or may be closely associated therewith. Of course, the compressed digital video data transmission logic of the present invention could reside in hardware, software, or some combination of the two.

It will be appreciated by one having ordinary skill in the art that the technique of the present invention may be implemented in any computer network having a standardized protocol for utilizing a central termination system (e.g. Head End) to schedule timeslots for remote stations or nodes on a return (or upstream) channel. In wireless networks, the central termination system may be referred to as a Head End or wireless base station. In satellite networks, the central termination system may be referred to as a master controlling station.

In one embodiment, the routers and CMTSs are used primarily to route and direct IP data within the cable or telco headend to serve large number of end subscribers. The tiling methods described in this invention addresses on the application layer capabilities for adding value to the data being carried by the headend equipment. The capabilities described in this document reside within the MPEG-2 (application) layer, which is usually carried as payload of the IP data stream. In a specific embodiment, an integrated processing combining the capabilities described above with that routing processing capability may reside within a linecard or on a separate system connecting to the router via the IP port.

Compressed video data combining as described herein eliminates the need for real-time complete decoding and re-encoding in every network device, central office, or headend. This dramatically reduces the complexity cost of each of these devices and reduces the cost for a digital service implementing a large number of these devices. For example, in the case of IP multicasting, there may be tens or hundreds of thousands of subscribers, using a variety of network conditions, and trying to access the same video content from the same server. Without the present invention, a complete decoding and re-encoding is required for each different network condition.

While this invention has been described in terms of several preferred embodiments, there are alterations, permutations, and equivalents which fall within the scope of this invention which have been omitted for brevity's sake. For example, the present invention may be used to perform bandwidth sharing, despite the fact that the available bandwidth from the transmission facility, which includes but is not limited to, xDSL, ATM, wireless channel, is sufficient to send the incoming compressed bitstream. In general, for data traffic, such as TCP/IP based traffic, the data bit rate cannot be determined. In addition, the video bitstream may not have constant bit rate, therefore, the resulting total bandwidth cannot be determined before the connection is established. The application of bit rate conversion, however, will ensure that the resulting total bandwidth will always be less than the total available channel bandwidth. It is therefore intended that the scope of the invention should be determined with reference to the appended claims.

What is claimed is:

1. A method for transmitting a bitstream comprising compressed video data, the method comprising:
   receiving first compressed video data at a low resolution;
   receiving second compressed video data at a high resolution;
   determining the size of a low resolution border around a set of macroblocks included in a frame of the first compressed video data;
   generating additional compressed video data displayable at the high resolution;
   tiling macroblocks from the first compressed video data and macroblocks from the additional compressed video data; and
   combining tiled first compressed video data and the second compressed video data into an output compressed bitstream including compressed video data that is displayable at the high resolution.

2. The method of claim 1 wherein the additional video data includes static video data macroblocks.

3. The method of claim 1 wherein macroblocks from the first compressed video data are tiled within the low resolution border and the additional compressed video data macroblocks are tiled outside the low resolution border.

4. The method of claim 1 further including inserting pan-and-scan information into the compressed bitstream.

5. The method of claim 1, wherein the bitstream comprises MPEG-1, MPEG-2 or MPEG-4 compressed video data.

6. The method of claim 1, wherein determining the size of a low resolution border around a set of macroblocks included in a frame of the first compressed video data, generating additional compressed video data displayable at the high resolution, and tiling macroblocks from the first compressed video data and macrobiotics from the additional compressed video data are performed in real time.

7. The method of claim 1, further comprising transcoding the output compressed bitstream.

8. The method of claim 1, wherein combining the tiled first compressed video data and the second compressed video data into the output compressed bitstream includes splicing the tiled first compressed video data and the second compressed video data or includes remultiplexing the tiled first compressed video data and the second compressed video data.

9. A system for transmitting a bitstream comprising compressed video data, the system comprising:
　　means for receiving first compressed video data at a low resolution;
　　means for receiving second compressed video data at a high resolution;
　　means for determining the size of a low resolution border around a set of macroblocks included in a frame of the first compressed video data;
　　means for generating additional compressed video data displayable at the high resolution;
　　means for tiling macroblocks from the first compressed video data and macroblocks from the additional compressed video data; and
　　means for combining tiled first compressed video data and the second compressed video data into an output compressed bitstream including compressed video data that is displayable at the high resolution.

10. A system as recited in claim 9, wherein the additional compressed video data includes static video data macroblocks.

11. A system as recited in claim 9, wherein the means for tiling macroblocks is configured to tile the macroblocks from the first compressed video data within the low resolution border and to tile the the additional compressed video data macroblocks outside the low resolution border.

12. A system as recited in claim 9, further comprising means for inserting pan-and-scan information into the compressed bitstream.

13. A system as recited in claim 9, wherein the bitstream comprises MPEG-1, MPEG-2 or MPEG-4 compressed video data.

14. A system as recited in claim 9, further comprising means for transcoding the output compressed bitstream.

15. A system as recited in claim 9, wherein the means for combining the tiled first compressed video data and the second compressed video data into the output compressed bitstream includes means for splicing the tiled first compressed video data and the second compressed video data, or includes means for remultiplexing the tiled first compressed video data and the second compressed video data.

16. Software tangibly embodied in a computer readable media and including instructions comprising:
　　instructions for receiving first compressed video data at a low resolution;
　　instructions for receiving second compressed video data at a high resolution;
　　instructions for determining the size of a low resolution border around a set of macroblocks included in a frame of the first compressed video data;
　　instructions for generating additional compressed video data displayable at the high resolution;
　　instructions for tiling macroblocks from the first compressed video data and macroblocks from the additional compressed video data; and
　　instructions for combining tiled first compressed video data and the second compressed video data into an output compressed bitstream including compressed video data that is displayable at the high resolution.

17. Software as recited in claim 16, wherein the additional compressed video data includes static video data macroblocks.

18. Software as recited in claim 16, wherein macroblocks from the first compressed video data are tiled within the low resolution border and the additional compressed video data macroblocks are tiled outside the low resolution border.

19. Software as recited in claim 16, further comprising instructions for inserting pan-and-scan information into the compressed bitstream.

20. Software as recited in claim 16, wherein the bitstream comprises MPEG-1, MPEG-2 or MPEG-4 compressed video data.

21. Software as recited in claim 16, further comprising instructions for determining the size of a low resolution border, generating additional compressed video data, and tiling macroblocks from the first compressed video data and macroblocks from the additional compressed video data in real time.

22. Software as recited in claim 16, further comprising instructions for transcoding the output compressed bitstream.

* * * * *